US012663867B2

(12) United States Patent
Lehmann et al.

(10) Patent No.: US 12,663,867 B2
(45) Date of Patent: Jun. 23, 2026

(54) HAPTIC STRUCTURE FOR PROVIDING HAPTIC OUTPUTS AT AN ELECTRONIC DEVICE

(71) Applicant: Apple Inc., Cupertino, CA (US)

(72) Inventors: Alex J. Lehmann, Sunnyvale, CA (US); Joonas I. Ponkala, San Jose, CA (US); Keith J. Hendren, San Francisco, CA (US); Xian Wang, San Mateo, CA (US); Yu-Lin Kao, Livermore, CA (US); Kevin C. Armendariz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/899,117

(22) Filed: Aug. 30, 2022

(65) Prior Publication Data

US 2023/0142264 A1 May 11, 2023

Related U.S. Application Data

(60) Provisional application No. 63/277,484, filed on Nov. 9, 2021.

(51) Int. Cl.
*G06F 3/01* (2006.01)
*G06F 3/02* (2006.01)
(Continued)

(52) U.S. Cl.
CPC ............ *G06F 3/016* (2013.01); *G06F 3/0202* (2013.01); *G06F 3/0414* (2013.01); *G06F 3/0443* (2019.05); *G06F 3/0447* (2019.05)

(58) Field of Classification Search
CPC ...... G06F 3/016; G06F 3/0414; G06F 3/0447; G06F 2203/04105; G06F 3/04144;
(Continued)

(56) References Cited

U.S. PATENT DOCUMENTS

| 5,196,745 A | 3/1993 | Trumper et al. |
| 5,293,161 A | 3/1994 | MacDonald et al. |

(Continued)

FOREIGN PATENT DOCUMENTS

| CN | 1846179 | 10/2006 |
| CN | 101036105 | 9/2007 |

(Continued)

OTHER PUBLICATIONS

Author Unknown, "3D Printed Mini Haptic Actuator," Autodesk, Inc., 16 pages, 2016.

(Continued)

*Primary Examiner* — Temesghen Ghebretinsae
*Assistant Examiner* — Ivelisse Martinez Quiles
(74) *Attorney, Agent, or Firm* — Brownstein Hyatt Farber Schreck, LLP

(57) ABSTRACT

Embodiments are directed to an electronic device that includes a cover and a haptic module positioned below the cover. The haptic module includes a substrate positioned below the cover and offset from the cover, a spacer positioned between the substrate and the cover and coupling the substrate to the cover, and a piezoelectric element positioned on a surface of the substrate and offset from the cover to define a gap between the piezoelectric element and the cover. The electronic device can also include a sensor coupled to the cover and configured to detect an input, and a processing unit operably coupled to the piezoelectric element and configured to cause the piezoelectric element to deflect the cover in response to the sensor detecting the input.

20 Claims, 11 Drawing Sheets

100

205

(51) Int. Cl.
  *G06F 3/041*       (2006.01)
  *G06F 3/044*       (2006.01)
(58) Field of Classification Search
  CPC .... G06F 3/0202; G06F 3/0443; G06F 1/1658;
                    G06F 1/1684; G06F 3/0412
  See application file for complete search history.

(56)                References Cited

U.S. PATENT DOCUMENTS

| | | | |
|---|---|---|---|
| 5,424,756 A | 6/1995 | Ho et al. | |
| 5,434,549 A | 7/1995 | Hirabayashi et al. | |
| 5,436,622 A | 7/1995 | Gutman et al. | |
| 5,668,423 A | 9/1997 | You et al. | |
| 5,739,759 A | 4/1998 | Nakazawa et al. | |
| 5,842,967 A | 12/1998 | Kroll | |
| 6,084,319 A | 7/2000 | Kamata et al. | |
| 6,342,880 B2 | 1/2002 | Rosenberg et al. | |
| 6,373,465 B2 | 4/2002 | Jolly et al. | |
| 6,388,789 B1 | 5/2002 | Bernstein | |
| 6,438,393 B1 | 8/2002 | Surronen | |
| 6,445,093 B1 | 9/2002 | Binnard | |
| 6,493,612 B1 | 12/2002 | Bisset et al. | |
| 6,554,191 B2 | 4/2003 | Yoneya | |
| 6,693,622 B1 | 2/2004 | Shahoian et al. | |
| 6,777,895 B2 | 8/2004 | Shimoda et al. | |
| 6,822,635 B2 | 11/2004 | Shahoian | |
| 6,864,877 B2 | 3/2005 | Braun et al. | |
| 6,952,203 B2 | 10/2005 | Banerjee et al. | |
| 6,988,414 B2 | 1/2006 | Ruhrig et al. | |
| 7,068,168 B2 | 6/2006 | Girshovich et al. | |
| 7,080,271 B2 | 7/2006 | Kardach et al. | |
| 7,126,254 B2 | 10/2006 | Nanataki et al. | |
| 7,130,664 B1 | 10/2006 | Williams | |
| 7,196,688 B2 | 3/2007 | Shena et al. | |
| 7,202,851 B2 | 4/2007 | Cunningham et al. | |
| 7,234,379 B2 | 6/2007 | Claesson et al. | |
| 7,253,350 B2 | 8/2007 | Noro et al. | |
| 7,276,907 B2 | 10/2007 | Kitagawa et al. | |
| 7,321,180 B2 | 1/2008 | Takeuchi et al. | |
| 7,323,959 B2 | 1/2008 | Naka et al. | |
| 7,336,006 B2 | 2/2008 | Watanabe et al. | |
| 7,339,572 B2 | 3/2008 | Schena | |
| 7,355,305 B2 | 4/2008 | Nakamura et al. | |
| 7,360,446 B2 | 4/2008 | Dai et al. | |
| 7,370,289 B1 | 5/2008 | Ebert et al. | |
| 7,385,874 B2 | 6/2008 | Vuilleumier | |
| 7,392,066 B2 | 6/2008 | Hapamas | |
| 7,423,631 B2 | 9/2008 | Shahoian et al. | |
| 7,508,382 B2 | 3/2009 | Denoue et al. | |
| 7,570,254 B2 | 8/2009 | Suzuki et al. | |
| 7,576,477 B2 | 8/2009 | Koizumi | |
| 7,656,388 B2 | 2/2010 | Schena et al. | |
| 7,667,371 B2 | 2/2010 | Sadler et al. | |
| 7,667,691 B2 | 2/2010 | Boss et al. | |
| 7,675,414 B2 | 3/2010 | Ray | |
| 7,710,397 B2 | 5/2010 | Krah et al. | |
| 7,710,399 B2 | 5/2010 | Bruneau et al. | |
| 7,741,938 B2 | 6/2010 | Kramlich | |
| 7,755,605 B2 | 7/2010 | Daniel et al. | |
| 7,798,982 B2 | 9/2010 | Zets et al. | |
| 7,825,903 B2 | 11/2010 | Anastas et al. | |
| 7,855,657 B2 | 12/2010 | Doemens et al. | |
| 7,890,863 B2 | 2/2011 | Grant et al. | |
| 7,893,922 B2 | 2/2011 | Klinghult et al. | |
| 7,904,210 B2 | 3/2011 | Pfau et al. | |
| 7,911,328 B2 | 3/2011 | Luden et al. | |
| 7,919,945 B2 | 4/2011 | Houston et al. | |
| 7,952,261 B2 | 5/2011 | Lipton et al. | |
| 7,952,566 B2 | 5/2011 | Poupyrev et al. | |
| 7,956,770 B2 | 6/2011 | Klinghult et al. | |
| 7,976,230 B2 | 7/2011 | Ryynanen et al. | |
| 8,002,089 B2 | 8/2011 | Jasso et al. | |
| 8,020,266 B2 | 9/2011 | Ulm et al. | |
| 8,040,224 B2 | 10/2011 | Hwang | |
| 8,053,688 B2 | 11/2011 | Conzola et al. | |
| 8,063,892 B2 | 11/2011 | Shahoian | |
| 8,072,418 B2 | 12/2011 | Crawford et al. | |
| 8,081,156 B2 | 12/2011 | Ruettiger | |
| 8,125,453 B2 | 2/2012 | Shahoian et al. | |
| 8,154,537 B2 | 4/2012 | Olien et al. | |
| 8,169,402 B2 | 5/2012 | Shahoian et al. | |
| 8,174,495 B2 | 5/2012 | Takashima et al. | |
| 8,174,512 B2 | 5/2012 | Ramstein et al. | |
| 8,188,989 B2 | 5/2012 | Levin | |
| 8,217,892 B2 | 7/2012 | Meadors | |
| 8,217,910 B2 | 7/2012 | Stallings et al. | |
| 8,232,494 B2 | 7/2012 | Purcocks | |
| 8,248,386 B2 | 8/2012 | Harrison | |
| 8,253,686 B2 | 8/2012 | Kyung | |
| 8,262,480 B2 | 9/2012 | Cohen et al. | |
| 8,264,465 B2 | 9/2012 | Grant et al. | |
| 8,265,292 B2 | 9/2012 | Leichter | |
| 8,265,308 B2 | 9/2012 | Gitzinger et al. | |
| 8,344,834 B2 | 1/2013 | Niiyama | |
| 8,345,025 B2 | 1/2013 | Seibert et al. | |
| 8,351,104 B2 | 1/2013 | Zaifrani et al. | |
| 8,378,797 B2 | 2/2013 | Pance et al. | |
| 8,378,965 B2 | 2/2013 | Gregorio et al. | |
| 8,384,316 B2 | 2/2013 | Houston et al. | |
| 8,390,218 B2 | 3/2013 | Houston et al. | |
| 8,390,572 B2 | 3/2013 | Marsden et al. | |
| 8,390,594 B2 | 3/2013 | Modarres et al. | |
| 8,400,027 B2 | 3/2013 | Dong et al. | |
| 8,405,618 B2 | 3/2013 | Colgate et al. | |
| 8,421,609 B2 | 4/2013 | Kim et al. | |
| 8,432,365 B2 | 4/2013 | Kim et al. | |
| 8,469,806 B2 | 6/2013 | Grant et al. | |
| 8,471,690 B2 | 6/2013 | Hennig et al. | |
| 8,493,177 B2 | 7/2013 | Flaherty et al. | |
| 8,493,189 B2 | 7/2013 | Suzuki | |
| 8,562,489 B2 | 10/2013 | Burton | |
| 8,576,171 B2 | 11/2013 | Grant | |
| 8,598,750 B2 | 12/2013 | Park | |
| 8,598,972 B2 | 12/2013 | Cho et al. | |
| 8,604,670 B2 | 12/2013 | Mahameed et al. | |
| 8,605,141 B2 | 12/2013 | Dialameh et al. | |
| 8,614,431 B2 | 12/2013 | Huppi et al. | |
| 8,619,031 B2 | 12/2013 | Hayward | |
| 8,624,448 B2 | 1/2014 | Kaiser et al. | |
| 8,628,173 B2 | 1/2014 | Stephens et al. | |
| 8,633,916 B2 | 1/2014 | Bernstein et al. | |
| 8,639,485 B2 | 1/2014 | Connacher et al. | |
| 8,643,480 B2 | 2/2014 | Maier et al. | |
| 8,648,829 B2 | 2/2014 | Shahoian et al. | |
| 8,653,785 B2 | 2/2014 | Collopy | |
| 8,654,524 B2 | 2/2014 | Pance et al. | |
| 8,681,130 B2 | 3/2014 | Adhikari | |
| 8,686,952 B2 | 4/2014 | Burrough et al. | |
| 8,717,151 B2 | 5/2014 | Forutanpour et al. | |
| 8,730,182 B2 | 5/2014 | Modarres et al. | |
| 8,749,495 B2 | 6/2014 | Grant et al. | |
| 8,754,759 B2 | 6/2014 | Fadell et al. | |
| 8,760,037 B2 | 6/2014 | Eshed et al. | |
| 8,773,247 B2 | 7/2014 | Ullrich | |
| 8,780,074 B2 | 7/2014 | Castillo et al. | |
| 8,797,153 B2 | 8/2014 | Vanhelle et al. | |
| 8,797,295 B2 | 8/2014 | Bernstein et al. | |
| 8,803,670 B2 | 8/2014 | Steckel et al. | |
| 8,834,390 B2 | 9/2014 | Couvillon | |
| 8,836,502 B2 | 9/2014 | Culbert et al. | |
| 8,836,643 B2 | 9/2014 | Jolliff et al. | |
| 8,867,757 B1 | 10/2014 | Ooi | |
| 8,872,448 B2 | 10/2014 | Boldyrev et al. | |
| 8,878,401 B2 | 11/2014 | Lee | |
| 8,890,824 B2 | 11/2014 | Guard | |
| 8,907,661 B2 | 12/2014 | Maier et al. | |
| 8,976,139 B2 | 3/2015 | Koga et al. | |
| 8,976,141 B2 | 3/2015 | Myers et al. | |
| 8,977,376 B1 | 3/2015 | Lin et al. | |
| 8,981,682 B2 | 3/2015 | Delson et al. | |
| 8,987,951 B2 | 3/2015 | Park | |
| 9,008,730 B2 | 4/2015 | Kim et al. | |
| 9,024,738 B2 | 5/2015 | Van Schyndel et al. | |
| 9,046,947 B2 | 6/2015 | Takeda | |

(56) References Cited

U.S. PATENT DOCUMENTS

| | | |
|---|---|---|
| 9,049,339 B2 | 6/2015 | Muench |
| 9,052,785 B2 | 6/2015 | Horie |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,092,056 B2 | 7/2015 | Myers et al. |
| 9,094,762 B2 | 7/2015 | Wong et al. |
| 9,104,285 B2 | 8/2015 | Colgate et al. |
| 9,116,570 B2 | 8/2015 | Lee et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,182,837 B2 | 11/2015 | Day |
| 9,218,727 B2 | 12/2015 | Rothkopf et al. |
| 9,228,908 B2 | 1/2016 | Aliane et al. |
| 9,245,704 B2 | 1/2016 | Maharjan et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,285,905 B1 | 3/2016 | Buuck et al. |
| 9,286,907 B2 | 3/2016 | Yang et al. |
| 9,304,587 B2 | 4/2016 | Wright et al. |
| 9,319,150 B2 | 4/2016 | Peeler et al. |
| 9,348,414 B2 | 5/2016 | Kagayama |
| 9,348,473 B2 | 5/2016 | Ando |
| 9,361,018 B2 | 6/2016 | Pasquero et al. |
| 9,396,629 B1 | 7/2016 | Weber et al. |
| 9,430,042 B2 | 8/2016 | Levin |
| 9,436,280 B2 | 9/2016 | Tartz et al. |
| 9,442,570 B2 | 9/2016 | Slonneger |
| 9,448,631 B2 | 9/2016 | Winter et al. |
| 9,448,713 B2 | 9/2016 | Cruz-Hernandez et al. |
| 9,449,476 B2 | 9/2016 | Lynn et al. |
| 9,459,734 B2 | 10/2016 | Day |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Burnbaum et al. |
| 9,513,704 B2 | 12/2016 | Heubel et al. |
| 9,519,346 B2 | 12/2016 | Lacroix et al. |
| 9,535,500 B2 | 1/2017 | Pasquero et al. |
| 9,539,164 B2 | 1/2017 | Sanders et al. |
| 9,542,028 B2 | 1/2017 | Filiz et al. |
| 9,557,830 B2 | 1/2017 | Grant |
| 9,557,857 B2 | 1/2017 | Schediwy |
| 9,563,274 B2 | 2/2017 | Senanayake |
| 9,564,029 B2 | 2/2017 | Morrell et al. |
| 9,594,429 B2 | 3/2017 | Bard et al. |
| 9,600,037 B2 | 3/2017 | Pance et al. |
| 9,600,071 B2 | 3/2017 | Rothkopf |
| 9,607,491 B1 | 3/2017 | Mortimer et al. |
| 9,627,163 B2 | 4/2017 | Ely et al. |
| 9,632,583 B2 | 4/2017 | Virtanen et al. |
| 9,639,158 B2 | 5/2017 | Levesque et al. |
| 9,666,040 B2 | 5/2017 | Flaherty et al. |
| 9,690,379 B2 | 6/2017 | Tremblay |
| 9,707,593 B2 | 7/2017 | Berte |
| 9,710,061 B2 | 7/2017 | Pance et al. |
| 9,727,238 B2 | 8/2017 | Peh et al. |
| 9,733,704 B2 | 8/2017 | Cruz-Hernandez et al. |
| 9,762,236 B2 | 9/2017 | Chen et al. |
| 9,823,828 B2 | 11/2017 | Zambetti et al. |
| 9,829,981 B1 | 11/2017 | Ji |
| 9,830,782 B2 | 11/2017 | Morrell et al. |
| 9,857,872 B2 | 1/2018 | Terlizzi et al. |
| 9,870,053 B2 | 1/2018 | Modarres et al. |
| 9,874,980 B2 | 1/2018 | Brunet et al. |
| 9,875,625 B2 | 1/2018 | Khoshkava et al. |
| 9,878,239 B2 | 1/2018 | Heubel et al. |
| 9,886,057 B2 | 2/2018 | Bushnell et al. |
| 9,886,090 B2 | 2/2018 | Silvanto et al. |
| 9,902,186 B2 | 2/2018 | Whiteman et al. |
| 9,904,393 B2 | 2/2018 | Frey et al. |
| 9,921,649 B2 | 3/2018 | Grant et al. |
| 9,927,887 B2 | 3/2018 | Bulea |
| 9,927,902 B2 | 3/2018 | Burr et al. |
| 9,928,950 B2 | 3/2018 | Lubinski et al. |
| 9,940,013 B2 | 4/2018 | Choi et al. |
| 9,971,407 B2 | 5/2018 | Holenarsipur et al. |
| 9,977,499 B2 | 5/2018 | Westerman et al. |
| 9,990,040 B2 | 6/2018 | Levesque |
| 9,996,199 B2 | 6/2018 | Park et al. |
| 10,025,399 B2 | 7/2018 | Kim et al. |
| 10,032,550 B1 | 7/2018 | Zhang et al. |
| 10,037,660 B2 | 7/2018 | Khoshkava et al. |
| 10,061,385 B2 | 8/2018 | Churikov et al. |
| 10,069,392 B2 | 9/2018 | Degner et al. |
| 10,078,483 B2 | 9/2018 | Finnan et al. |
| 10,082,873 B2 | 9/2018 | Zhang |
| 10,108,265 B2 | 10/2018 | Harley et al. |
| 10,110,986 B1 | 10/2018 | Min |
| 10,120,446 B2 | 11/2018 | Pance et al. |
| 10,120,478 B2 | 11/2018 | Filiz et al. |
| 10,120,484 B2 | 11/2018 | Endo et al. |
| 10,122,184 B2 | 11/2018 | Smadi et al. |
| 10,133,351 B2 | 11/2018 | Weber et al. |
| 10,139,976 B2 | 11/2018 | Iuchi et al. |
| 10,146,336 B2 | 12/2018 | Lee et al. |
| 10,152,131 B2 | 12/2018 | Grant et al. |
| 10,152,182 B2 | 12/2018 | Haran et al. |
| 10,203,762 B2 | 2/2019 | Bradski et al. |
| 10,209,821 B2 | 2/2019 | Roberts-Hoffman et al. |
| 10,232,714 B2 | 3/2019 | Wachinger |
| 10,235,034 B2 | 3/2019 | Jitkoff et al. |
| 10,235,849 B1 | 3/2019 | Levesque |
| 10,248,221 B2 | 4/2019 | Pance et al. |
| 10,254,840 B2 | 4/2019 | Weinraub |
| 10,261,585 B2 | 4/2019 | Bard et al. |
| 10,275,075 B2 | 4/2019 | Hwang et al. |
| 10,282,014 B2 | 5/2019 | Butler et al. |
| 10,284,935 B2 | 5/2019 | Miyoshi |
| 10,289,199 B2 | 5/2019 | Hoellwarth |
| 10,343,061 B2 | 7/2019 | Billington et al. |
| 10,346,117 B2 | 7/2019 | Sylvan et al. |
| 10,372,214 B1 | 8/2019 | Gleeson et al. |
| 10,373,381 B2 | 8/2019 | Nuernberger et al. |
| 10,382,866 B2 | 8/2019 | Min |
| 10,390,139 B2 | 8/2019 | Biggs |
| 10,394,326 B2 | 8/2019 | Ono et al. |
| 10,397,686 B2 | 8/2019 | Forstner et al. |
| 10,430,077 B2 | 10/2019 | Lee |
| 10,437,359 B1 | 10/2019 | Wang et al. |
| 10,459,226 B2 | 10/2019 | Leppanen et al. |
| 10,531,191 B2 | 1/2020 | Macours |
| 10,556,252 B2 | 2/2020 | Tsang et al. |
| 10,564,721 B2 | 2/2020 | Cruz-Hernandez et al. |
| 10,585,480 B1 | 3/2020 | Bushnell et al. |
| 10,591,993 B2 | 3/2020 | Lehmann et al. |
| 10,599,223 B1 | 3/2020 | Amin-Shahidi et al. |
| 10,622,538 B2 | 4/2020 | Zhang et al. |
| 10,649,529 B1 | 5/2020 | Nekimken et al. |
| 10,685,626 B2 | 6/2020 | Kim et al. |
| 10,691,211 B2 | 6/2020 | Amin-Shahidi et al. |
| 10,698,489 B1 | 6/2020 | Beyhs et al. |
| 10,768,738 B1 | 9/2020 | Wang et al. |
| 10,768,747 B2 | 9/2020 | Wang et al. |
| 10,775,889 B1 | 9/2020 | Lehmann et al. |
| 10,809,830 B2 | 10/2020 | Kim et al. |
| 10,845,220 B2 | 11/2020 | Song et al. |
| 10,845,878 B1 | 11/2020 | Zhao et al. |
| 10,890,978 B2 | 1/2021 | Bushnell et al. |
| 10,936,071 B2 | 3/2021 | Pandya et al. |
| 10,942,571 B2 | 3/2021 | Hendren et al. |
| 10,963,117 B2 | 3/2021 | Morrell et al. |
| 10,996,007 B2 | 5/2021 | Tashiro |
| 11,024,135 B1 | 6/2021 | Ostdiek et al. |
| 11,054,932 B2 | 7/2021 | Xu et al. |
| 11,073,712 B2 | 7/2021 | Yeke Yazdandoost et al. |
| 11,086,509 B2 | 8/2021 | Lapp |
| 11,188,151 B2 | 11/2021 | Bushnell et al. |
| 11,460,946 B2 | 10/2022 | Xu et al. |
| 12,296,108 B2 | 5/2025 | English |
| 2003/0117132 A1 | 6/2003 | Klinghult |
| 2005/0036603 A1 | 2/2005 | Hughes |

(56) References Cited

U.S. PATENT DOCUMENTS

| | | |
|---|---|---|
| 2005/0191604 A1 | 9/2005 | Allen |
| 2005/0230594 A1 | 10/2005 | Sato et al. |
| 2006/0017691 A1 | 1/2006 | Cruz-Hernandez et al. |
| 2006/0209037 A1 | 9/2006 | Wang et al. |
| 2006/0223547 A1 | 10/2006 | Chin et al. |
| 2006/0252463 A1 | 11/2006 | Liao |
| 2007/0106457 A1 | 5/2007 | Rosenberg |
| 2007/0152974 A1 | 7/2007 | Kim et al. |
| 2008/0062145 A1 | 3/2008 | Shahoian |
| 2008/0062624 A1 | 3/2008 | Regen |
| 2008/0084384 A1 | 4/2008 | Gregorio et al. |
| 2008/0111791 A1 | 5/2008 | Nikittin |
| 2009/0085879 A1 | 4/2009 | Dai et al. |
| 2009/0115734 A1 | 5/2009 | Fredriksson et al. |
| 2009/0166098 A1 | 7/2009 | Sunder |
| 2009/0167702 A1 | 7/2009 | Nurmi |
| 2009/0174672 A1 | 7/2009 | Schmidt |
| 2009/0207129 A1 | 8/2009 | Ullrich et al. |
| 2009/0225046 A1 | 9/2009 | Kim et al. |
| 2009/0243404 A1 | 10/2009 | Kim et al. |
| 2009/0267892 A1* | 10/2009 | Faubert ............... G09G 3/3406 |
| | | 345/156 |
| 2010/0116629 A1 | 5/2010 | Borissov et al. |
| 2010/0225600 A1 | 9/2010 | Dai et al. |
| 2010/0313425 A1 | 12/2010 | Hawes |
| 2010/0328229 A1 | 12/2010 | Weber et al. |
| 2011/0115754 A1 | 5/2011 | Cruz-Hernandez |
| 2011/0128239 A1 | 6/2011 | Polyakov et al. |
| 2011/0132114 A1 | 6/2011 | Siotis |
| 2011/0169347 A1 | 7/2011 | Miyamoto et al. |
| 2011/0205038 A1 | 8/2011 | Drouin et al. |
| 2011/0261021 A1 | 10/2011 | Modarres et al. |
| 2011/0267181 A1 | 11/2011 | Kildal |
| 2011/0267294 A1 | 11/2011 | Kildal |
| 2012/0038469 A1 | 2/2012 | Dehmoubed et al. |
| 2012/0038471 A1 | 2/2012 | Kim et al. |
| 2012/0056825 A1 | 3/2012 | Ramsay et al. |
| 2012/0062491 A1 | 3/2012 | Coni et al. |
| 2012/0113008 A1 | 5/2012 | Makinen et al. |
| 2012/0235942 A1 | 9/2012 | Shahoian et al. |
| 2012/0249474 A1 | 10/2012 | Pratt et al. |
| 2012/0327006 A1 | 12/2012 | Israr et al. |
| 2013/0016042 A1 | 1/2013 | Makinen et al. |
| 2013/0021296 A1 | 1/2013 | Min et al. |
| 2013/0043670 A1 | 2/2013 | Holmes |
| 2013/0044049 A1 | 2/2013 | Biggs et al. |
| 2013/0076635 A1 | 3/2013 | Lin |
| 2013/0154996 A1 | 6/2013 | Trend et al. |
| 2013/0207793 A1 | 8/2013 | Weaber et al. |
| 2014/0118419 A1 | 5/2014 | Wu et al. |
| 2014/0125470 A1 | 5/2014 | Rosenberg |
| 2014/0168175 A1 | 6/2014 | Mercea et al. |
| 2015/0084909 A1 | 3/2015 | Worfolk et al. |
| 2015/0122621 A1* | 5/2015 | Fukumoto ............. H01H 13/85 |
| | | 29/25.35 |
| 2015/0126070 A1 | 5/2015 | Candelore |
| 2015/0182113 A1 | 7/2015 | Utter, II |
| 2015/0185842 A1 | 7/2015 | Picciotto et al. |
| 2015/0186609 A1 | 7/2015 | Utter, II |
| 2015/0234493 A1 | 8/2015 | Parivar et al. |
| 2015/0293592 A1 | 10/2015 | Cheong et al. |
| 2016/0171767 A1 | 6/2016 | Anderson |
| 2016/0253019 A1 | 9/2016 | Geaghan |
| 2016/0293829 A1 | 10/2016 | Maharjan et al. |
| 2016/0327911 A1 | 11/2016 | Eim et al. |
| 2016/0328930 A1 | 11/2016 | Weber |
| 2016/0334901 A1 | 11/2016 | Rihn |
| 2016/0364001 A1* | 12/2016 | Hirose ................. G06F 3/0412 |
| 2016/0379776 A1 | 12/2016 | Oakley |
| 2017/0024010 A1 | 1/2017 | Weinraub |
| 2017/0083096 A1 | 3/2017 | Rihn et al. |
| 2017/0085402 A1 | 3/2017 | Hajati |
| 2017/0090655 A1 | 3/2017 | Zhang et al. |
| 2017/0249024 A1 | 8/2017 | Jackson et al. |
| 2017/0336273 A1 | 11/2017 | Elangovan et al. |
| 2017/0357325 A1 | 12/2017 | Yang et al. |
| 2017/0364158 A1 | 12/2017 | Wen et al. |
| 2018/0005496 A1 | 1/2018 | Dogiamis et al. |
| 2018/0015362 A1 | 1/2018 | Terahata |
| 2018/0029078 A1 | 2/2018 | Park et al. |
| 2018/0081438 A1* | 3/2018 | Lehmann .............. G06F 3/0202 |
| 2018/0284894 A1 | 10/2018 | Raut et al. |
| 2018/0335883 A1 | 11/2018 | Choi et al. |
| 2018/0373325 A1 | 12/2018 | Rosso et al. |
| 2019/0033923 A1* | 1/2019 | Wang .................... G06F 1/1656 |
| 2019/0073079 A1 | 3/2019 | Xu et al. |
| 2019/0278232 A1 | 9/2019 | Ely et al. |
| 2020/0057421 A1* | 2/2020 | Trikha .................. G06F 3/0412 |
| 2020/0073477 A1 | 3/2020 | Pandya |
| 2020/0251648 A1 | 8/2020 | Fukumoto |
| 2020/0278747 A1* | 9/2020 | Ligtenberg ............ G06F 3/0213 |
| 2020/0328614 A1 | 10/2020 | Jackson et al. |
| 2021/0157411 A1 | 5/2021 | Bushnell et al. |
| 2021/0176548 A1 | 6/2021 | Fenner et al. |
| 2021/0319894 A1 | 10/2021 | Sobol et al. |
| 2021/0398403 A1 | 12/2021 | Ostdiek et al. |
| 2022/0214790 A1* | 7/2022 | Zhang ................. G06F 3/03547 |
| 2023/0377430 A1 | 11/2023 | Ostdiek et al. |
| 2023/0384863 A1 | 11/2023 | Bushnell et al. |
| 2024/0064447 A1 | 2/2024 | Fenner et al. |
| 2024/0404377 A1 | 12/2024 | Ostdiek et al. |
| 2025/0110560 A1 | 4/2025 | Zhang et al. |
| 2025/0155981 A1 | 5/2025 | Bushnell et al. |

FOREIGN PATENT DOCUMENTS

| | | |
|---|---|---|
| CN | 201044066 | 4/2008 |
| CN | 101409164 | 4/2009 |
| CN | 101436099 | 5/2009 |
| CN | 101663104 | 3/2010 |
| CN | 101872257 | 10/2010 |
| CN | 201897778 | 7/2011 |
| CN | 201945951 | 8/2011 |
| CN | 102349039 | 2/2012 |
| CN | 102448555 | 5/2012 |
| CN | 203405773 | 1/2014 |
| CN | 203630729 | 6/2014 |
| CN | 104679233 | 6/2015 |
| CN | 105144052 | 12/2015 |
| CN | 106133650 | 11/2016 |
| CN | 106354203 | 1/2017 |
| CN | 206339935 | 7/2017 |
| CN | 107305452 | 10/2017 |
| CN | 207115337 | 3/2018 |
| DE | 214030 | 3/1983 |
| EP | 1686776 | 8/2006 |
| EP | 2743798 | 6/2014 |
| EP | 3098690 | 11/2016 |
| JP | 2004129120 | 4/2004 |
| JP | 2004236202 | 8/2004 |
| JP | 2010537279 | 12/2010 |
| JP | 2010540320 | 12/2010 |
| JP | 2012048378 | 3/2012 |
| KR | 20050033909 | 4/2005 |
| KR | 101016208 | 2/2011 |
| KR | 20130137124 | 12/2013 |
| TW | 2010035805 | 10/2010 |
| TW | 201430623 | 8/2014 |
| WO | WO 02/073587 | 9/2002 |
| WO | WO 06/091494 | 8/2006 |
| WO | WO 07/049253 | 5/2007 |
| WO | WO 07/114631 | 10/2007 |
| WO | WO 09/038862 | 3/2009 |
| WO | WO 09/156145 | 12/2009 |
| WO | WO 10/129221 | 11/2010 |
| WO | WO 10/129892 | 11/2010 |
| WO | WO 12/173818 | 12/2012 |
| WO | WO 13/169303 | 11/2013 |
| WO | WO 14/066516 | 5/2014 |
| WO | WO 14/200766 | 12/2014 |
| WO | WO 16/091944 | 6/2016 |

(56) References Cited

FOREIGN PATENT DOCUMENTS

| | | |
|---|---|---|
| WO | WO 16/144563 | 9/2016 |
| WO | WO 19/003254 | 1/2019 |

OTHER PUBLICATIONS

Hasser et al., "Preliminary Evaluation of a Shape-Memory Alloy Tactile Feedback Display," Advances in Robotics, Mechantronics, and Haptic Interfaces, Asme, Dsc- vol. 49, pp. 73-80, 1993.

Hill et al., "Real-time Estimation of Human Impedance for Haptic Interfaces," Stanford Telerobotics Laboratory, Department of Mechanical Engineering, Stanford University, 6 pages, at least as early as Sep. 30, 2009.

Lee et al., "Haptic Pen: Tactile Feedback Stylus for Touch Screens," Mitsubishi Electric Research Laboratories, http://wwwlmerl.com, 6 pages, Oct. 2004.

Stein et al., "A process chain for integrating piezoelectric transducers into aluminum die castings to generate smart lightweight structures," Results in Physics 7, pp. 2534-2539, 2017.

"Lofelt at Smart Haptics 2017," Auto-generated transcript from YouTube video clip, uploaded on Jun. 12, 2018 by user "Lofelt," Retrieved from Internet: <https://www.youtube.com/watch?v=3w7LTQKS430>, 3 pages.

"Tutorial: Haptic Feedback Using Music and Audio - Precision Microdrives," Retrieved from Internet Nov. 13, 2019: https://www.precisionmicrodrives.com/haptic-feedback/tutorial-haptic-feedback-using-music-and-audio/, 9 pages.

"Feel what you hear: haptic feedback as an accompaniment to mobile music playback," Retrieved from Internet Nov. 13, 2019: https://dl.acm.org/citation.cfm?id=2019336, 2 pages.

"Auto Haptic Widget for Android," Retrieved from Internet Nov. 13, 2019, https://apkpure.com/auto-haptic-widget/com.immersion.android.autohaptic, 3 pages.

D-BOX Home, Retrieved from Internet Nov. 12, 2019: https://web.archive.org/web/20180922193345/https://www.d-box.com/en, 4 pages.

* cited by examiner

HAPTIC STRUCTURE FOR PROVIDING HAPTIC OUTPUTS AT AN ELECTRONIC DEVICE

This application is a nonprovisional patent application of and claims the benefit of U.S. Provisional Patent Application No. 63/277,484, filed Nov. 9, 2021 and titled "Haptic Structure for Providing Haptic Outputs at an Electronic Device," the disclosure of which is hereby incorporated herein by reference in its entirety.

FIELD

The described embodiments relate generally to providing haptic outputs at an electronic device. More particularly, the present embodiments relate to piezoelectric structures for providing haptic outputs at an electronic device.

BACKGROUND

Electronic devices such as laptops, tablets, and smartphones often have different ways of notifying users of different events that occur. This can include playing sounds, providing haptic outputs such as a vibration, displaying a visual notification, and so on. The haptic output may be provided by an actuator that utilizes a vibratory motor or an oscillating motor. However, these vibratory motors typically vibrate the entire electronic device and are not able to provide a localized haptic output. Further, typical vibratory motors tend to be bulky, and it may be desirable to have haptic structures that can be positioned in smaller spaces and/or take up less room.

SUMMARY

Embodiments are directed to an electronic device that includes a cover and a haptic module positioned below the cover. The haptic module may include a substrate positioned below the cover, a spacer positioned between the substrate and the cover and coupling the substrate to the cover, and a piezoelectric element positioned on the substrate and offset from the cover to define a gap between the piezoelectric element and the cover. The electronic device can also include a sensor coupled to the cover and configured to detect an input, and a processing unit operably coupled to the piezoelectric element and configured to cause the piezoelectric element to deflect the cover in response to the sensor detecting the input.

Embodiments are also directed to an electronic device that includes an enclosure component, a cover coupled to the enclosure component, and first and second haptic modules positioned below the cover. Each of the first and second haptic modules may include an actuation strip that includes a substrate and a piezoelectric element attached to the substrate. Each of the first and second haptic modules may also include a spacer positioned between the actuation strip and the cover and defining a gap between the actuation strip and the cover. The electronic device can also include a touch sensor positioned along the cover and configured to determine a location of a touch input to the cover, and a processing unit configured to cause at least one of the first haptic module or the second haptic module to actuate in response to the touch input.

Embodiments are further directed to an electronic device that includes an upper portion comprising a display, and a lower portion coupled to the upper portion where the lower portion defines a keyboard and a track pad. The electronic device can include a haptic module positioned below the track pad. The haptic module can include a spacer attached to an internal surface of the track pad and an actuation strip coupled to the spacer thereby defining a gap between the actuation strip and the internal surface of the track pad. The actuation strip may include a substrate and a piezoelectric element coupled to the substrate. The electronic device can further include a processing unit operably coupled to the haptic module and configured to cause a deflection of the actuation strip to produce a haptic output along an outer surface of the track pad.

BRIEF DESCRIPTION OF THE DRAWINGS

The disclosure will be readily understood by the following detailed description in conjunction with the accompanying drawings, wherein like reference numerals designate like structural elements, and in which.

Figure 1:
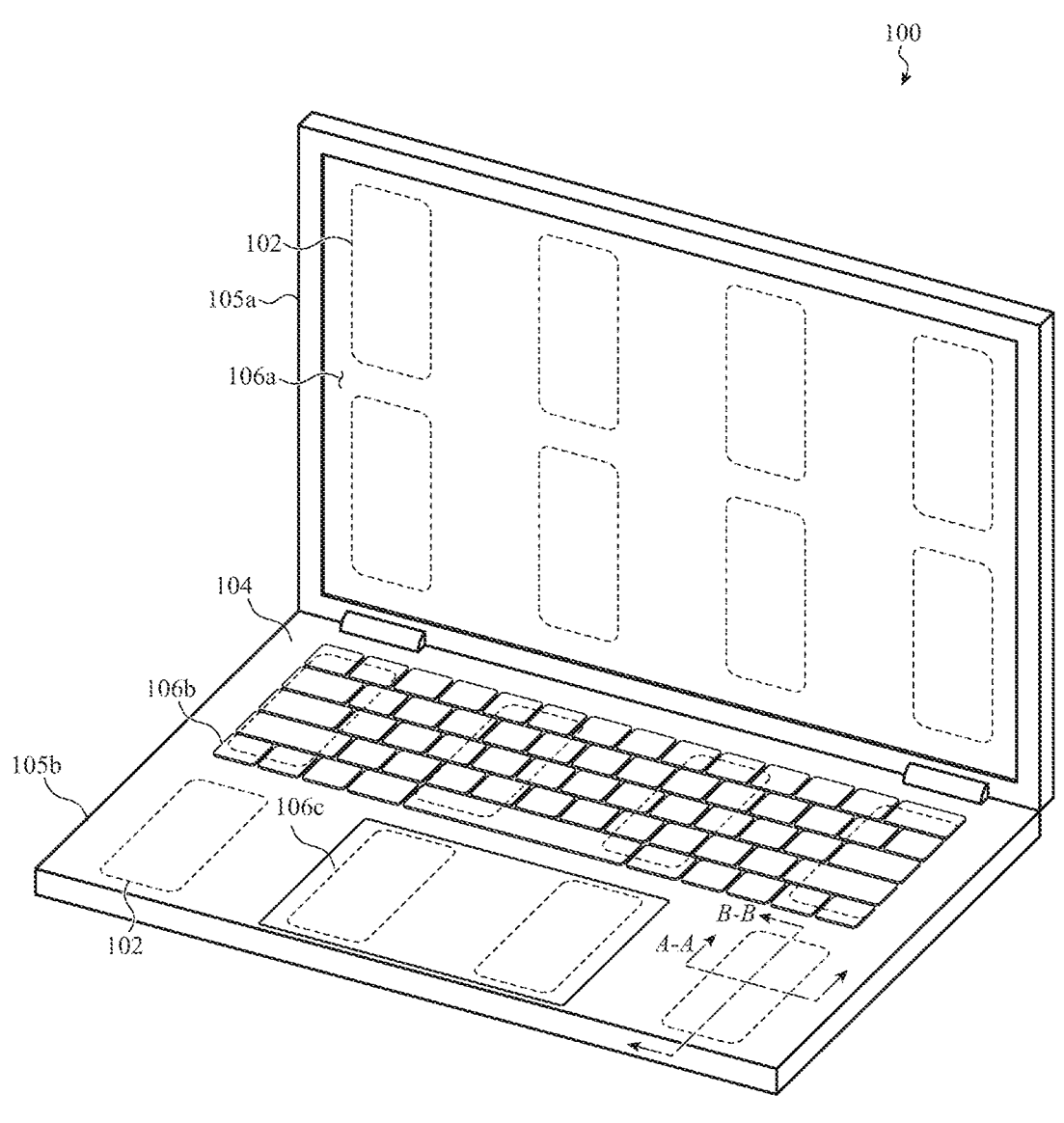
FIG. 1 shows an example of an electronic device that includes haptic structures for providing localized haptic outputs.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to electronic devices that include haptic modules for providing localized haptic outputs. The haptic modules can be coupled to an input mechanism of an electronic device, which can include touch-sensitive surface(s) such as a track pad, a touch-sensitive display and/or a virtual keyboard, or other housing structures. The haptic modules can be coupled directly to an input mechanism and cause deformation of the input mechanism through actuation of a piezoelectric element. In some cases, multiple haptic modules can be positioned along an input mechanism to produce a unified output that results from the combination of the deformation caused by each haptic module. The haptic modules described herein can include a structure that includes a thin stack-up while reducing stress on a piezoelectric element. In some cases, the structure of the haptic modules described herein may also reduce manufacturing complexity by allowing for a range of mounting orientations and/or reducing alignment sensitivity. The haptic modules may also include touch sensors that can determine a location and/or force of a touch to the input mechanism. In this regard, one or more of the haptic structures can be actuated to provide a coordinated and localized haptic output at the input mechanism.

The haptic modules can include a structure that reduces stress on the piezoelectric element by offsetting the piezoelectric element from the input mechanism. The haptic module can include a substrate that is coupled to the input mechanism by a spacer. The spacer can offset the substrate from the input mechanism by creating a gap between the substrate and the input mechanism. The piezoelectric element can be coupled to the substrate and offset from the input mechanism. The spacer can also create a gap between the piezoelectric element and the input mechanism. When the piezoelectric element is actuated, the motion of the piezoelectric element can be transferred through the substrate and spacer to cause the input mechanism to deform. Additionally or alternatively, when the input mechanism is deformed, for example, in response to a touch input, the deformation of the input surface is transferred to the piezoelectric element through the spacer and the substrate. In this regard, the spacer and the substrate may function to reduce the stress on the piezoelectric element as compared to a piezoelectric element that is coupled directly to the input mechanism.

In some cases, an electronic device can include a case and the input mechanism can be coupled to the case. The haptic module can be suspended from an inner surface of the input mechanism. The case can include an opening that is aligned with the haptic module. In this regard the haptic module can be positioned within the opening and/or deform into the opening when the piezoelectric element is actuated. The structure of the haptic module may be referred to as being "self-contained," which is used here to indicate that the haptic module can deform a structure, such as an input mechanism, without being attached to a secondary support structure such as another portion of the housing. For example, the haptic module can cause deformation in the input mechanism by expanding and contracting along one or more first directions, which causes deformation of the input surface in one or more second directions that may be substantially orthogonal to the one or more first directions. The actuation of the haptic module can cause buckling type movements in the input mechanism. In this regard, the self-contained structure of the haptic module may be less sensitive to alignment on the input mechanism and/or reduce the overall thickness of the haptic module as compared to other types of haptic actuators.

In some cases, the electronic device described herein can include a touch sensor. The touch sensor can include an array of first electrodes that are positioned on an input mechanism and that move with the input mechanism. The touch sensor can include an array of second electrodes that remain substantially fixed with respect to movement of the array of first electrodes. In this regard, the touch sensor can output signals that are indicative of changes in distance between the first and second arrays of electrodes and the electronic device can determine a location of touch input and/or an estimated force of the touch input based on the touch sensor signals. The electronic device can actuate one or more haptic modules to produce a haptic output at the input mechanism in response to touch input. In some cases, the haptic output can be generated by an actuation of a single haptic module. In other cases, the haptic output can be a combination of outputs from multiple haptic modules positioned along the input mechanism. For example, each haptic module can be independently actuated to produce a unified output that results from the combination of the independently actuated haptic modules.

These and other embodiments are discussed below with reference to FIGS. 1-10. However, those skilled in the art will readily appreciate that the detailed description given herein with respect to these Figures is for explanatory purposes only and should not be construed as limiting.

FIG. 1 shows an example electronic device 100 that includes haptic modules 102 for providing haptic outputs. As shown in FIG. 1, the electronic device 100 may be a laptop computing device. Although laptop electronic devices are shown in the figures and described below, the haptic modules described herein may be used with various electronic devices including, but not limited to, tablets, mobile phones, personal digital assistants, a time keeping device, a health monitoring device, a wearable electronic device, an input device (e.g., a stylus), a desktop computer, electronic glasses, and so on. Although various electronic devices are mentioned, the haptic modules 102 of the present disclosure may also be used in conjunction with other products and combined with various materials.

For example, the haptic modules 102 may be used on a band of a wearable electronic device, a dashboard for an automobile, a steering wheel for an automobile, a housing of an electronic device, a keyboard, and so on. Use of the haptic modules 102 described herein may replace conventional rotary or linear actuators. As a result, the profile of the electronic device may be smaller and/or thinner.

The electronic device 100 may include a housing that includes an enclosure component 104 and one or more input mechanisms 106. In some embodiments, the input mechanisms 106 may be a touch-sensitive input device such as a trackpad, a keyboard, a touch-sensitive display, and so on. The electronic device 100 can include one or more haptic modules 102 that can be coupled to different portions of the housing. For example, as shown in FIG. 1, a laptop computing device can include an upper portion 105a and a lower portion 105b. The upper portion 105a can include a first input mechanism 106a that functions as a first display and provides visual outputs to a user. In some cases the first input mechanism 106a can include a touch sensitive display and receive touch inputs from a user. One or more haptic modules 102 can be coupled to the first input mechanism 106a and be configured to provide haptic outputs along the first input mechanism 106a.

The lower portion 105b of the laptop can include one or more additional input mechanisms. For example, the lower portion may include a second input mechanism 106b that functions as a keyboard and a third input mechanism 106c that functions as a track pad. In some cases, the second and third input mechanisms 106b, 106c can be distinct structures. For example, the second input mechanism 106b can be a keyboard or a touch-sensitive input device that functions as a keyboard and the third input mechanism 106c can be another touch-sensitive input device that functions as a track pad. In this example, the second input mechanism 106b may include key regions which can be displayed virtually (e.g., by a display) and/or be physical features of the second input mechanism 106b (e.g., physical keys, printed key designations, and so on). The key regions can be configured in a variety of ways such as corresponding to a QWERTY keyboard layout. The second input mechanism 106b can include haptic modules 102 that correspond to one or more of the key regions, for example, each haptic module may be positioned below one or more of the designated key regions and be configured to provide localized haptic outputs in the region of the second input mechanism 106b. For example, haptic modules positioned below key regions may be configured to provide key haptic feedback to keyboard inputs such as click-type feedback that corresponds to a keystroke input at one or more key regions. Additionally or alternatively, the third input mechanism 106c may include a touch-sensitive surface that is configured to detect touch inputs, but may not include a display. One or more haptic modules 102 can also be positioned beneath the third input mechanism 106c and be configured to provide localized haptic outputs in the region of the third input mechanism 106c.

In other cases, the lower portion 105b can include a single input mechanism such as a touch-sensitive display that displays different regions corresponding to different input structures. For example, the touch-sensitive display may display a key region that is operable as a virtual keyboard and a trackpad region that is operable as a virtual trackpad. In these cases, a first set of haptic modules can include haptic modules 102 that are each positioned beneath one or more key regions and configured to provide localized haptic outputs to keyboard inputs. A second set of haptic modules may include haptic modules 102 that are positioned below the trackpad region and configured to provide localized haptic outputs to the track pad region.

In some embodiments, one or more of the input mechanisms 106 may be a touch-sensitive display and configured to determine a location of a touch on an input surface of the corresponding input mechanism 106. Thus, when a touch sensor detects the location of the touch, an electronic signal may drive one or more haptic modules 102 at the detected location, thereby generating haptic output at that location.

The touch sensor may be a capacitive-based touch sensor that is disposed relative to a corresponding input mechanism 106 or a display stack of the electronic device 100. Although a capacitive-based touch sensor is provided as one example, other types of sensors or sensing arrangements may be used.

The electronic device 100 may also include a force-sensing element that uses a force sensor to detect and measure the magnitude of force of a touch on a surface of the electronic device 100. The surface may be, for example, a display, a keyboard region, a track pad, or some other input mechanism or surface of the electronic device 100.

The haptic modules 102, as described herein, may be combined or otherwise integrated with the touch sensor or the force sensor and may provide both input and output capabilities. For example, the haptic modules 102 may provide haptic output at or near the location of any detected touch input. The haptic modules 102 may also provide various types of haptic output depending on the detected amount of force. In addition, the haptic modules 102 may be used to detect a received amount of force such as will be described below.

The electronic device 100 may include the case 104 that encloses one or more components of the electronic device 100. The case 104 may also be coupled to or may otherwise incorporate one or more haptic modules 102. For example, one or more haptic modules 102 may be coupled to the case 104 of the electronic device 100.

In some cases, the haptic modules 102 disclosed herein may also be used in place of the feedback that would normally be produced due to mechanical linkages or components of a physical key or traditional input mechanism. For example, the second input mechanism 106b may include a touch sensitive surface that includes a sheet of material that defines a virtual keyboard (e.g., no mechanical keys) and the corresponding haptic modules 102 can provide haptic feedback that simulate the tactile or haptic response of a mechanical key or provide other feedback in response to a touch or press. In other cases, the second input mechanism 106b may include mechanical keys or key regions that actuate or move in response to user input (e.g., keystrokes) and the corresponding haptic module 102 can be configured to provide haptic feedback in addition to any feedback provided by the movement of the keys.

In one implementation, when a force is received at or near the location of the haptic module 102, the haptic module 102 may generate an electrical signal (e.g., pulse or other signal having a voltage and/or current) that is measurable by an electronic component of the electronic device 100. A processing element or sensor circuitry may be responsive to the electrical signal and may recognize the signal as an input. The input may be treated as a binary input (e.g., counted as an input if the charge or current exceeds a threshold) or a variable input that varies over a continuum (e.g., different properties of the signal correspond to different amounts of input or different inputs).

To continue the example, the amount of current or voltage generated by the haptic module 102 may vary based on the type of input received. For example, if an amount of current generated or detected is above a first threshold, it may indicate that a first type of touch input is received (e.g., a quick touch or press). If an amount of current generated or detected is above a second threshold, it may indicate that a second type of touch input is received (e.g., a long touch or press).

The haptic module 102 may also work in conjunction with one or more force-sensing elements or one or more force sensors to determine an amount of force that is applied to an input surface (or other surface) of the electronic device 100. In addition, the haptic module 102 may be used to determine the location of the received input, and to determine one or more gestures associated with the received input. For example, if a haptic structure or a series of haptic structures detect a touch input over a certain time period and over a certain distance on a surface of the electronic device 100, a swipe gesture may be detected.

Figure 2:
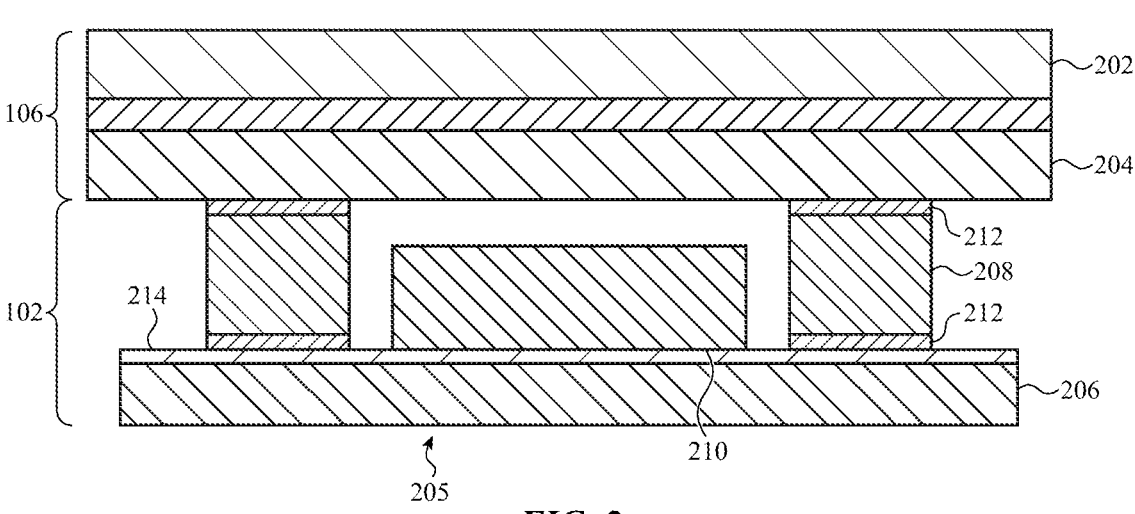
FIG. 2 shows a cross-sectional view of the haptic structure shown in FIG. 1.

FIG. 2 shows a cross-sectional view of the electronic device 100 taken along section line A-A shown in FIG. 1. The cross-sectional view shows an example input mechanism 106 and an example haptic module 102 coupled the input mechanism 106. The input mechanism 106 can be an example of a touch-sensitive display and include a transparent cover 202 (which may be referred to simply as a "cover") positioned over a display 204. The cover 202 and the case 104 along with other components may form a sealed internal volume of the electronic device 100, which may contain the internal electrical components of the electronic device 100. In some cases, the cover 202 defines substantially the entire front face and/or front surface of the electronic device 100. The cover 202 may also define an input surface of the electronic device 100. For example, as described herein, the electronic device 100 may include touch and/or force sensors that detect inputs applied to the cover 202. The cover 202 may be formed from or include glass, sapphire, a polymer, a dielectric, or any other suitable material.

The display 204 may be positioned under the cover 202 and at least partially within the case 104. The display 204 may define an output region in which graphical outputs are displayed. Graphical outputs may include graphical user interfaces, user interface elements (e.g., buttons, sliders, etc.), text, lists, photographs, videos, or the like. The display 204 may include a liquid-crystal display (LCD), an organic light emitting diode display (OLED), or any other suitable components or display technology. In some cases, the display 204 may output a graphical user interface with one or more graphical objects that display information.

The display 204 may be touch- and/or force-sensitive and include or be associated with touch sensors and/or force sensors that extend along the output region of the display and which may use any suitable sensing elements and/or sensing techniques. Using touch sensors, the electronic device 100 may detect touch inputs applied to the cover 202, including detecting locations of touch inputs, motions of touch inputs (e.g., the speed, direction, or other parameters of a gesture applied to the cover 202), or the like. Using force sensors, the electronic device 100 may detect amounts or magnitudes of force associated with touch events applied to the cover 202. The touch and/or force sensors may detect various types of user inputs to control or modify the operation of the device, including taps, swipes, multiple finger inputs, single- or multiple-finger touch gestures, presses, and the like. Touch and/or force sensors may be usable with electronic devices, as described herein.

The haptic module 102 may include a substrate 206, a spacer 208, and a piezoelectric element 210. The substrate 206 can be positioned below the cover 202 and within an interior of the electronic device 100. The spacer 208 can couple the substrate 206 to the cover 202, for example using adhesive layers 212, which may be any suitable type of adhesive such as a pressure sensitive adhesive. In some cases, an adhesive layer 212 can couple the spacer 208 to a bottom surface of the input mechanism 106, such as coupling the spacer 208 to a bottom surface of the display 204. The substrate 206 can be offset from the input mechanism 106 such that there is a gap between the substrate 206 and the input mechanism 106. In this regard, the spacer 208 may be the only component of the haptic module 102 that is directly coupled to the input mechanism 106. The substrate 206, the piezoelectric element 210, and a flexible circuit 214 may form an actuation strip 205 that is coupled to the input mechanism 106 by the spacer 208.

The piezoelectric element 210 can be positioned on the substrate 206 and offset from the input mechanism 106 such that there is a gap between the piezoelectric element 210 and the input mechanism 106. The piezoelectric element 210 can be coupled to the substrate 206 and configured to deform the substrate 206 when actuated. In some cases, the piezoelectric element 210 is coupled to an upper surface of the substrate 206 (as shown in FIG. 2). Additionally or alternatively, the piezoelectric element 210 can be coupled to other surfaces of the substrate 206, such as a bottom surface of the substrate 206 (not shown).

The piezoelectric element 210 may be offset from the input mechanism 106 such that it is not directly coupled to the input mechanism 106. When the piezoelectric element 210 is actuated, it may deform the substrate 206 which causes the movement of the piezoelectric element 210 to be transferred to the input mechanism 106 via the spacer 208. In this regard, the haptic module may have a structure that reduces the stress/strain between the input mechanism 106 and the piezoelectric element 210 as compared to piezoelectric materials that are directly coupled to the input mechanism 106 (e.g., are configured as a laminated layer within a display stack). For example, when the input mechanism 106 is deformed, for example in response to a touch input, the offset between the piezoelectric element 210 and the input mechanism 106 can reduce the amount of stress that is transferred from the input mechanism 106 and to the piezoelectric element 210.

The haptic module 102 can also include a flexible circuit 214 that electrically couples the piezoelectric element 210 to control components of the electronic device such as a piezo driver circuit, power source, processing unit, or other electronic components that provide inputs to and/or receive outputs from the piezoelectric element 210. In some cases, the flexible circuit 214 is positioned between the substrate 206 and the piezoelectric element 210 and includes electrical traces and/or other electrical components. In some cases, the flexible circuit 214 can include a polymer substrate such as a polyimide (PI) substrate and the routing traces can be coupled to the polymer substrate. In some embodiments, the flexible circuit 214 can extend from the piezoelectric element 210 and outside the spacer 208. For example, the flexible circuit 214 can include one or more electrical interfaces such as a zero insertion force (ZIF) interface, hot bar connection, and so on, that is positioned outside the spacer 208 and can be used to electrically couple the flexible circuit 214 to other electrical components of the electronic device 100.

The substrate 206 can be formed from a variety of materials including metals and alloys, polymers, ceramics, or any other suitable material or combinations thereof. In some cases, the substrate 206 is formed from a steel material such as a stainless steel. The spacer 208 can also be formed from a variety of materials including metals and alloys, polymers, ceramics, or any other suitable material or combinations thereof. In some cases, the spacer 208 is formed from molded polymer materials such as polycarbonate materials, polyethylene materials, polyamide materials (nylon), styrene materials, polypropylene materials, polyimide materials, acrylonitrile Butadiene Styrene (ABS) materials, rubbers such as silicone rubbers, combinations thereof, or any other suitable polymer materials. In some cases, the substrate 206 and/or the spacer 208 can include composite polymer materials such as glass filled polymers; carbon, graphite or metal reinforced polymers; or any other suitable composite materials.

The piezoelectric element 210 can include any suitable piezoelectric material including lead free piezoelectric materials such as KKN piezoelectric materials, polyvinylidene fluoride (PVDF) or any other suitable lead-free piezoelectric material. In some case, the piezoelectric element 210 can include other piezoelectric materials such as lead zirconate titanate (PZT). The piezoelectric element 210 can be coupled to the substrate 206 using any suitable techniques such as using adhesives, direct bonding, and so on.

The deformation properties of the haptic module 102 can be controlled and tuned by a variety of factors including the size (e.g., thickness), shape, materials properties of the substrate 206, the spacers 208, and the piezoelectric element 210. For example, these parameters of the haptic module 102 can be configured to impart a desired amount of deformation at the cover 202 to produce the targeted haptic output. In some cases, the haptic module 102 can be configured to produce deformations in the range of 5-30 microns. In some cases, the thickness of the substrate 206 can be in the range of 0.1-1.0 millimeters, the thickness of the spacer 208 can be in the range of 0.2-1.5 millimeters, and the thickness of the piezoelectric element 210 can be in the range of 0.1-1.0 millimeters. In some cases, the thickness of the piezoelectric element 210 is less than the thickness of the spacer 208, such that the piezoelectric element 210 is offset from the input mechanism 106.

In some cases, the gap that is formed between the actuation strip and the input mechanism can be filled with a material. For example, this material can be a gel, encapsulant, or other filler that fills the gap, for example to prevent the accumulation of dust or debris. In some cases, this filler material may not significantly affect the bending properties of the actuation strip and/or the input mechanism 106. For example, the filler material can be more compliant than the actuation strip 205 and/or the input mechanism 106.

Figure 3A:
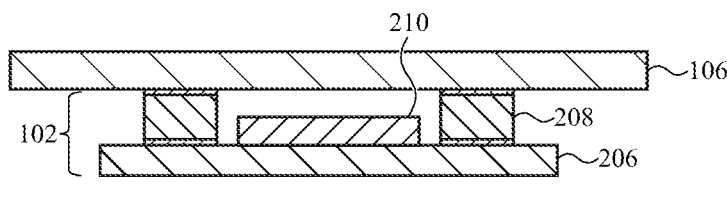
FIGS. 3A-3C show a cross-sectional view of example neutral and actuated states of the haptic structure shown in FIG. 1.
Figure 3B:
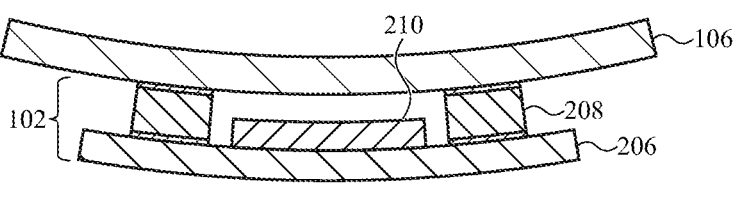
Figure 3C:
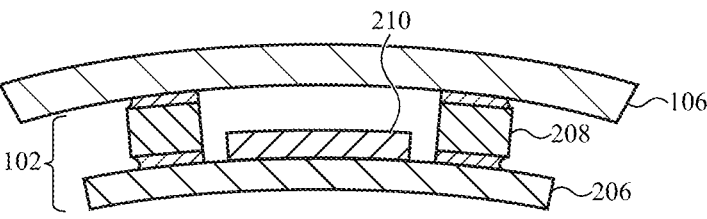
Figure 4A:
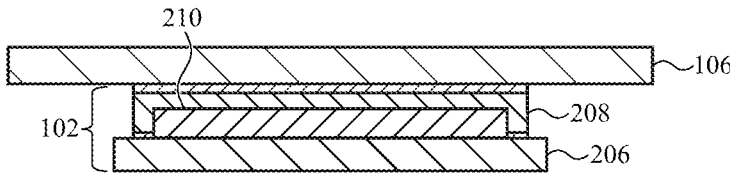
FIGS. 4A-4C show another cross-sectional view of example neutral and actuated states of the haptic structure shown in FIG. 1.
Figure 4B:
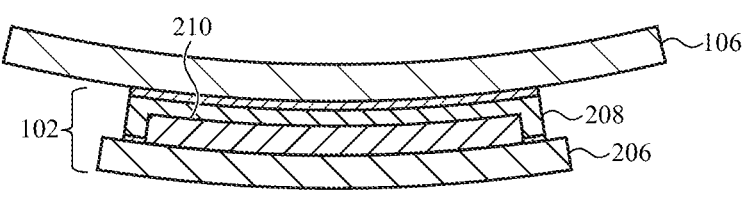
Figure 4C:
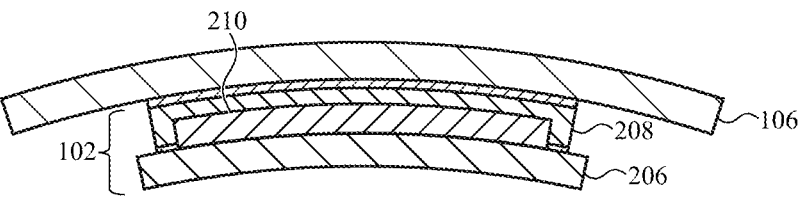

FIGS. 3A-3C show cross-sectional views taken along section line A-A and FIGS. 4A-4C show cross-sectional views taken along section line B-B of example neutral and actuated states of the haptic module 102 shown in FIG. 1. FIGS. 3A and 4A show an example of the haptic module 102 in a neutral state when the piezoelectric element 210 is in an inactive state. In the inactive state, the haptic module 102 may act as a passive structure and may move or otherwise deform in response to the input mechanism 106 being deformed, for example in response to a touch input.

FIGS. 3B and 4B show an example of the haptic module 102 in a first active state and FIGS. 3C and 4C shows an example of the haptic module 102 in a second active state. For example, when a first input signal is applied to the piezoelectric element 210, the piezoelectric element 210 may cause the substrate 206 to have a concave shape which, via the spacer 208, causes input mechanism 106 to also have a concave shape such as shown in FIGS. 3B and 4B. In some cases, the actuation of the piezoelectric element 210 causes the piezoelectrical element 210 to bend or otherwise deform the substrate 206, such as in a buckling mode. The bending or deforming of the substrate 206 can cause the spacer 208 to deform the input mechanism 106. In some cases, the piezoelectric element 210 can shorten or lengthen along a first direction (e.g., length and/or width of the piezoelectric element 210), which causes the input mechanism 106 to move in a second direction that is substantially orthogonal to the first direction. In this regard, the spacer 208 transfers the motion of the piezoelectric element 210 to the input mechanism 106.

When a second input signal is applied to the piezoelectric element 210, the piezoelectric element 210 may cause the substrate 206 to have a convex shape which, via the spacer 208, causes the input mechanism 106 to have a convex shape such as shown in FIGS. 3C and 4C. Each time the piezoelectric element 210 deflects, a haptic output may be provided.

In some embodiments, the piezoelectric element 210 may be driven to produce a discrete haptic output or may be driven to produce a continuous haptic output. Additionally, the piezoelectric element 210 may be driven at a range of frequencies to produce different types and intensities of haptic output. For example, the piezoelectric element 210 may be driven at frequencies of 1 Hz up to 1 kHz or more.

Figure 5A:
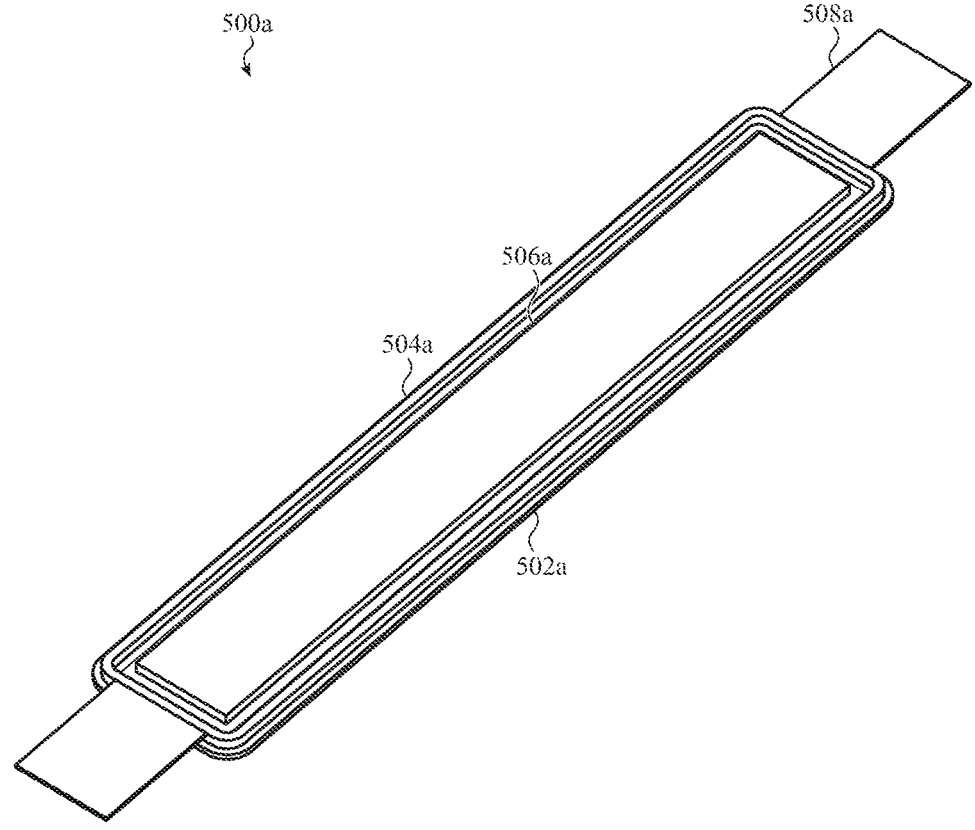
FIGS. 5A-5B show perspective views of example haptic structures.
Figure 5B:
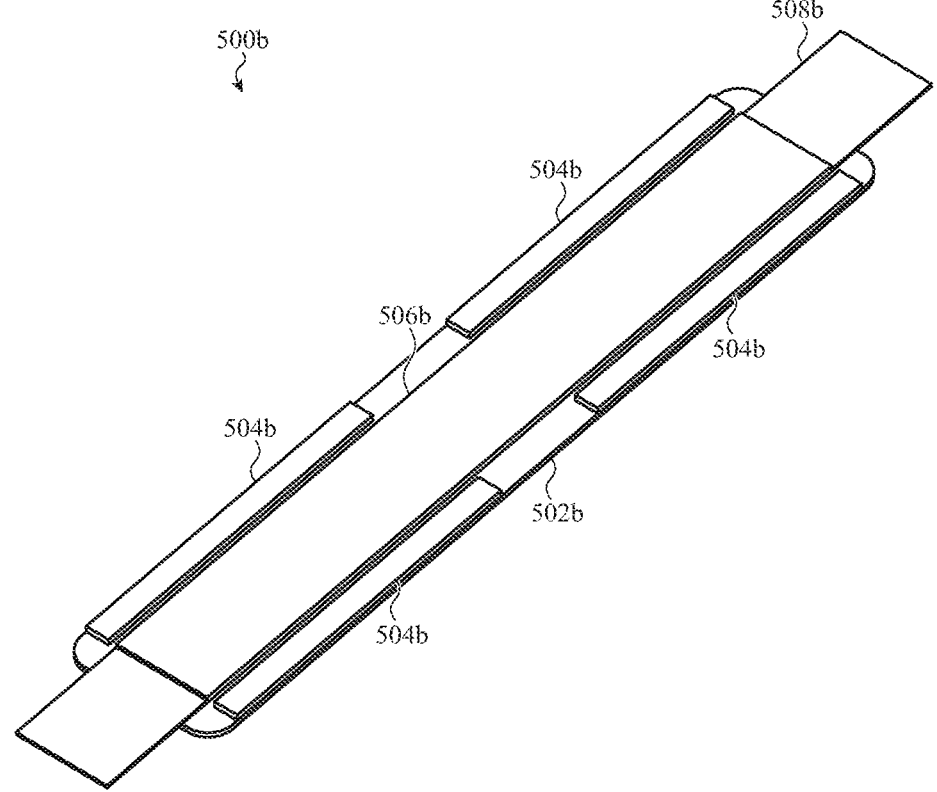

FIGS. 5A and 5B show a perspective view of example haptic modules 500. The haptic modules 500 may be examples of the haptic modules described herein. In the example shown in FIG. 5A, the haptic module 500a may include a substrate 502a, a spacer 504a, and a piezoelectric element 506a. The spacer 504a can extend around the piezoelectric element 506a. The spacer 504a can couple the substrate 502a to an input mechanism (not shown), such as input mechanism 106. In this regard, the substrate 502a, the spacer 504a, and the input mechanism may form a cavity that contains the piezoelectric element 506a. The piezoelectric element 506a may be coupled to the substrate 502a and offset from the input mechanism, as described herein. The haptic module 500a can include a flexible circuit 508a that extends past the end of the substrate 502a and electrically couples the haptic module 500a to an electronic device, as described herein. In other cases, the flexible circuit 508a can extend to the edge of the substrate 502a, be contained within the spacer 504a, or be arranged in other suitable configurations.

In the example shown in FIG. 5B, the haptic module 500b may include multiple spacer elements 504b that are positioned around the piezoelectric element 506b and couple the substrate 502b to an input mechanism (not shown), such as input mechanism 106. The spacer elements 504b can be configured in a variety of ways including a number of spacer elements 504b, lengths, widths, and thicknesses to cause a desired haptic response at the input mechanism. For example, the multiple discrete spacer elements 504b may be used to cause the input mechanism to deform in a defined pattern. The haptic module 500b can include a flexible circuit 508b that extends past the end of the substrate 502b and electrically couples the haptic module 500b to an electronic device, as described herein. In other cases, the flexible circuit 508b can extend to the edge of the substrate 502a, or be arranged in other suitable configurations.

Figure 6A:
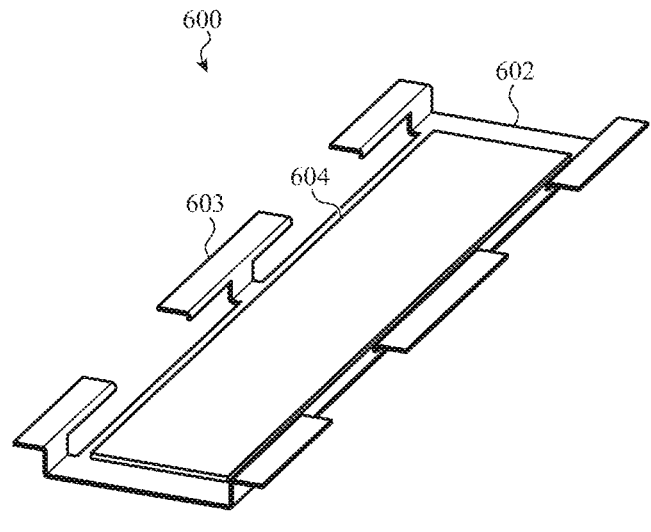
FIGS. 6A-6B show perspective views of example haptic structures.
Figure 6B:
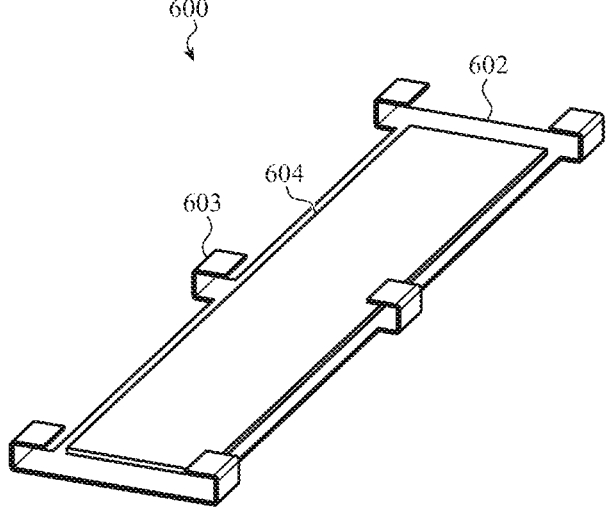

FIGS. 6A and 6B show perspective views of example haptic modules 600 that include an integrated substrate and spacer structure. The haptic modules 600 can be an example of the haptic modules described herein. For illustration purposes, the haptic modules 600 only show a substrate 602 and a piezoelectric element 604, however the haptic modules 600 can include other components such as a flexible circuit, coupling mechanisms (e.g., pressure sensitive adhesives), and so on. The haptic modules 600 can be configured to couple to an input mechanism, as described herein.

In the example shown in FIGS. 6A and 6B, the haptic modules 600 can include a substrate 602 that includes one or more spacer features 603 (only one labeled for clarity). The substrate 602 can be formed in a variety of ways such as from sheet metal processing procedures (e.g., stamping, binding, and so on); using molding techniques such as injection molding; using machining techniques; or any other suitable process. The piezoelectric element 604 can be coupled to the substrate 602 and the spacer features 603 can offset the piezoelectric element 604 from an input mechanism, as described herein.

Figure 7:
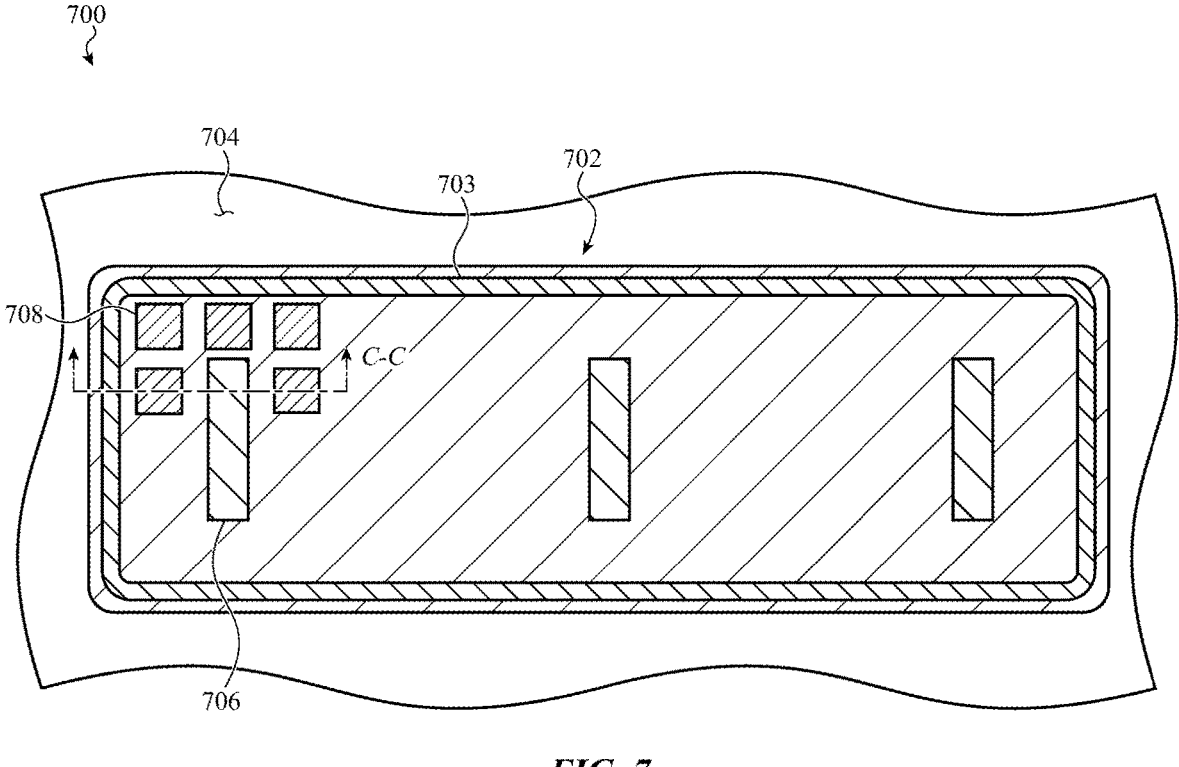
FIG. 7 shows a top view of a portion of an electronic device that includes haptic structures and force sensors.

FIG. 7 shows a top view of a portion of an electronic device 700 that includes haptic modules 706 and touch sensors 708. The electronic device 700 can be an example of the electronic devices described herein, such as electronic device 100. The electronic device 700 can have a housing that includes an input mechanism 702 that is coupled to a case 704. In some cases, the input mechanism 702 can be coupled to the case 704 by a seal 703, which can be a flexible seal. One or more haptic modules 706 (one of which is labeled for clarity) can be coupled to the input mechanism 702. One or more touch sensors 708 (one of which is labeled for clarity) can also be coupled to the input mechanism 702.

The touch sensors 708 can be implemented in a variety of ways including capacitive based sensors, strain based sensors, or other suitable touch and/or force sensing techniques. In some cases, the location of a touch input can be used to control outputs at different ones of the haptic modules 706. For example, a location of a touch can be used to determine a distance to multiple of the haptic modules 706, and a haptic output generated by each of the haptic modules 706 can be scaled in proportion to its respective distance from the determined location of the touch. In this regard, the haptic modules 706 can each be actuated in a different way to provide a combined haptic output at the input mechanism 702. In some cases, different drive signals can be supplied to each haptic module 706 to generate different haptic outputs. Various parameters of the drive signals can be varied such as an amplitude, energy, impulse, signal width, frequency, and so on to create different haptic effects at the haptic modules 706.

Figure 8A:
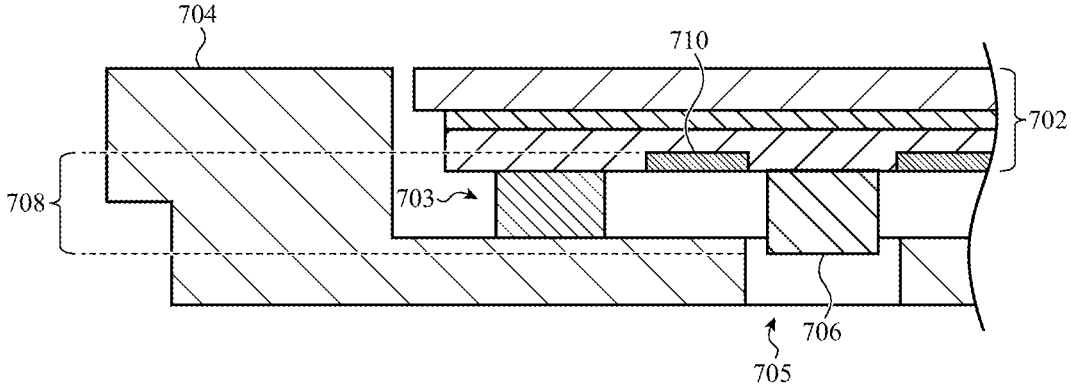
FIGS. 8A-8B show cross-sectional views of example haptic structures from FIG. 7.

FIG. 8A shows a cross-sectional view of the electronic device 700 taken along section C-C of FIG. 7. FIG. 8A shows an example touch sensor 708 structure in which the case 704 functions as a reference electrode and electrodes 710 (one of which is labeled for clarity) function as sensing electrodes. The electrodes 710 can be coupled to the input mechanism 702 and move with the input mechanism 702. For example, the input mechanism 702 may deform in response to a user touch, and this deformation can change the distance between one or more of the electrodes 710 and the case 704. Each touch sensor 708 can output a sensor signal that is indicative of this change in distance, and the processing unit can be configured to determine a location of a touch based on one or more of the sensor signals. In some cases, the sensor signals can be used to estimate a force of a touch. For example, the sensor signals can be used to determine a change in distance, which can be used to determine a force of the touch based on one or more calibration factors, a lookup table, the mechanical properties of the input mechanism 702, or other suitable factors, or a combination thereof. Additionally or alternatively, the sensor signals can be used to determine a location of a touch. For example, a strength of an electrical response of multiple ones of the touch sensors 708 can be used to interpolate or otherwise determine the position of a touch input.

In some cases, the case 704 can define an opening 705 and the haptic module 706 can be aligned and/or positioned in the opening 705. Accordingly, as the input mechanism 702 is deformed, the haptic module 706 can move with respect to the case 704 without contacting the case 704 or other internal components. In some cases, the opening 705 may help reduce the amount of space required for the haptic module 706 and help decrease the overall stack height of the haptic module 706 and/or input mechanism 702.

Additionally or alternatively, the seal 703 can be configured to function as a force sensor that can detect touches to the input mechanism 702. In some cases, the seal 703 can be configured as a capacitive-based sensor, a resistive-based sensor, or other suitable sensor. For example, the seal 703 can include a flexible component that separates opposing electrodes (not shown). The seal 703 can deform in response to a touch to the input mechanism 702 and the opposing electrode can output a signal that is used to determine a location of the touch and/or estimate a force of the touch.

Figure 8B:
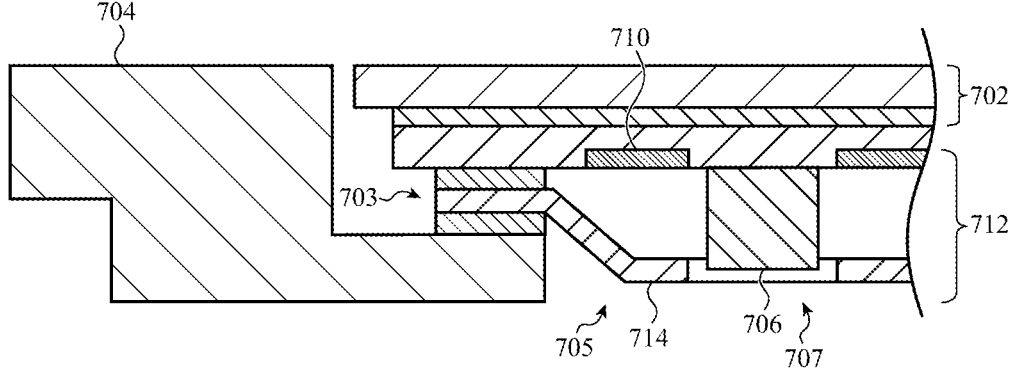

FIG. 8B shows a cross-sectional view of the electronic device 700 taken along section C-C of FIG. 7. FIG. 8B shows another example touch sensor 712 structure that includes a reference electrode 714 and sensing electrodes 710 (one of which is labeled for clarity). The sensing electrodes 710 can be coupled to the input mechanism 702 and move with the input mechanism 702. The reference electrode 714 can be coupled to the case 704 and configured to remain stationary with respect to the input mechanism 702. For example, the input mechanism 702 may deform in response to a user touch, and this deformation can change the distance between one or more of the electrodes 710 and the reference electrode 714. Each touch sensor 712 can output a sensor signal that is indicative of this change in distance, and the processing unit can be configured to determine a location and/or force of a touch based on one or more of the sensor signals, as described herein.

In some cases, the reference electrode 714 can be coupled to the case 704 by the seal 703. The case 704 can define a first opening 705 and the reference electrode 714 and/or the haptic module 706 can be aligned with and/or positioned within the first opening 705. Additionally or alternatively, the reference electrode 714 can define one or more second openings 707 (one of which is shown for clarity) and the haptic module 706 can be aligned with and/or positioned within the second opening 707. In this regard, the first opening 705 and/or the second opening 707 may reduce the overall stack height of the haptic module 706 by allowing the haptic module 706 to move within the first opening 705 and/or the second opening 707 as it is deformed and/or actuated.

Figures 9A, 9B:
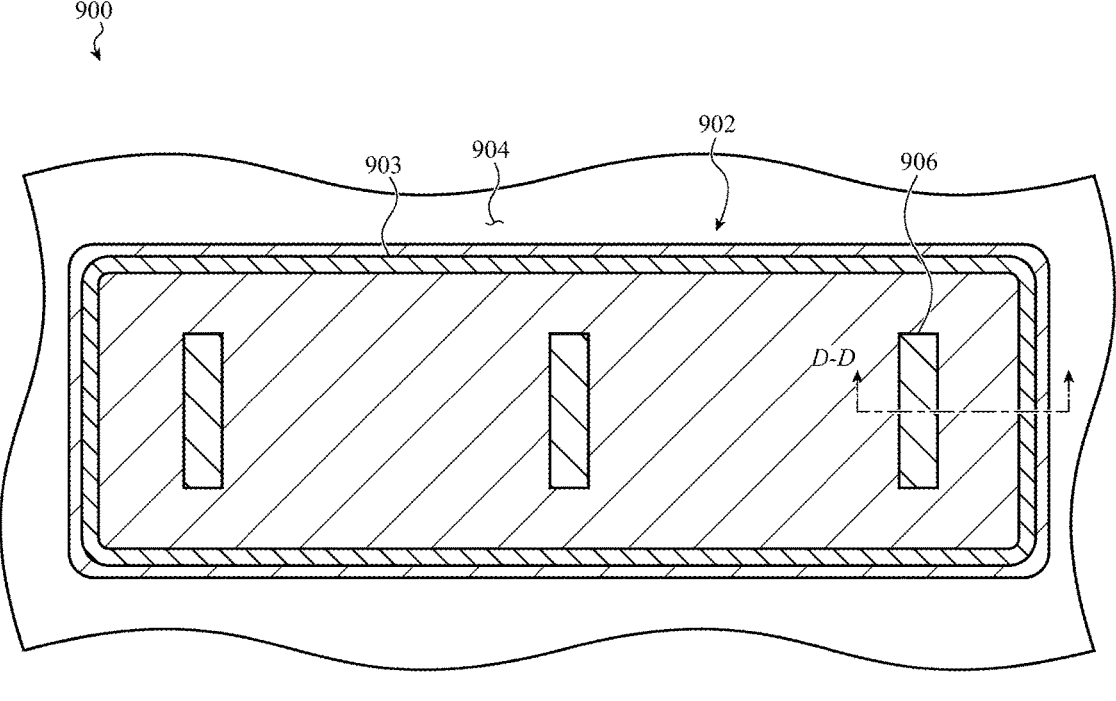
FIG. 9A shows a top view of a portion of an electronic device that includes haptic structures and force sensors.
FIG. 9B shows a cross-sectional view of the example haptic structure shown in FIG. 9A.

FIG. 9A shows a top view of a portion of an electronic device 900 that includes haptic modules 906 and touch sensors (shown in FIG. 9B). The electronic device 900 can be an example of the electronic devices described herein, such as electronic device 100. The electronic device 900 can have a housing that includes an input mechanism 902 that is coupled to a case 904. In some cases, the input mechanism 902 can be coupled to the case 904 by a seal 903, which can be a flexible seal, as described herein. One or more haptic modules 906 (one of which is labeled for clarity) can be coupled to the input mechanism 902. A touch and/or force sensor can be integrated into the input mechanism 902 as illustrated in FIG. 9B.

FIG. 9B shows a cross-sectional view of the electronic device 900 taken along section D-D of FIG. 9A. The input mechanism 902 can be an example of the input mechanisms described herein and includes a cover 908, an electrode layer 909, a compliant layer 910, and a first substrate 912. The haptic module 906 can be coupled beneath the input mechanism 902. The haptic module 906 can be an example of the haptic modules described herein and includes a second substrate 914, a spacer 916, and a piezoelectric element 918.

The input mechanism 902 can be configured to determine a location of a touch and/or estimate a force of the touch based on changes in thickness of the compliant layer 910. For example, a touch input on the cover 908 can cause the compliant layer 910 to compress. The first substrate 912 can be configured to remain substantially undeformed and the electrode layer 909 can deform with the compliant layer 910 and towards the first substate. In this regard the input mechanism 902 can be configured to output one or more signals that are indicative of the change in distance between the electrode layer 909 and the first substrate 912. In some cases, the electrode layer 909 can include an array of individual electrodes that each output a signal that is indicative of the change in distance between the respective electrode and the first substrate 912.

The cover 908 can be an example of the covers described herein and be formed from a transparent material. The input mechanism 902 can also include a display 911 which can be an example of the displays described herein.

In some cases, the compliant layer 910 includes an array of flexible structures that are positioned between the cover 908 and the first substrate 912. For example, the flexible structures can be an array of discrete elastomeric columns such as a gel-dot array that maintains the cover 908 and the first substrate 912 at a separation distance when no touch input is present and compress to reduce the distance between the cover 908 and the first substrate 912 in response to a touch input. The first substrate 912 can be formed from a variety of materials including metals and alloys, polymers, ceramics, or any other suitable material or combinations thereof.

The haptic module 906 may be configured to cause a haptic output at the cover 908 by deflecting the input mechanism 902. In this regard, the haptic module 906 can be configured to cause the first substrate 912, the display 911, the compliant layer 910, the electrode layer 909, and the cover 908 to deflect when the piezoelectric element 918 is actuated.

Figure 10:
FIG. 10 is an example block diagram of an electronic device including haptic structures for providing localized outputs.
Figure 10:
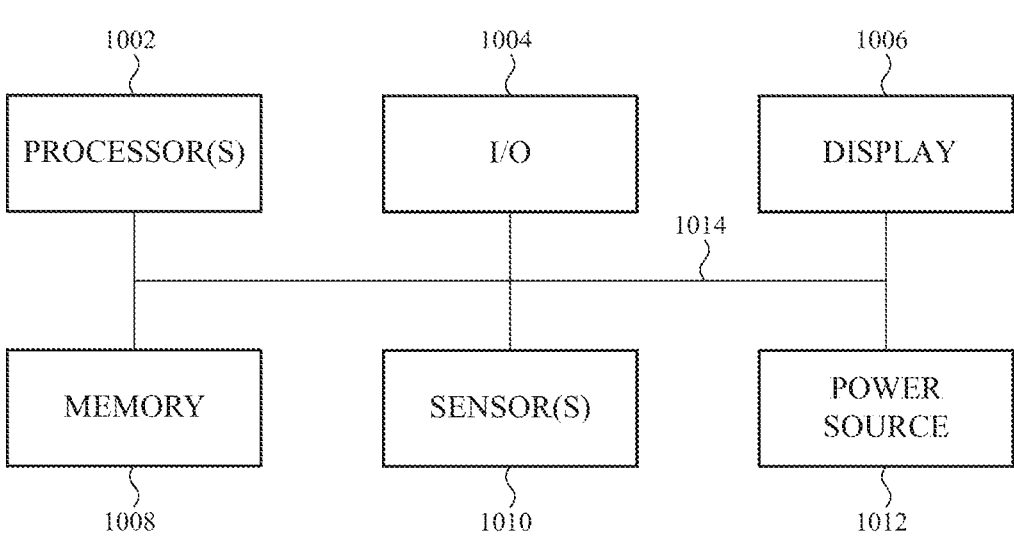

FIG. 10 is an example block diagram of an electronic device 1000 including haptic structures for providing haptic outputs, which can take the form of any of the devices as described with reference to FIGS. 1-9. The electronic device 1000 can include a processor 1002, an input/output (I/O) mechanism 1004 (e.g., wired or wireless communications interfaces), a display 1006, memory 1008, sensors 1010 (e.g., touch and/or force sensors), and a power source 1012 (e.g., a rechargeable battery). The processor 1002 can control some or all of the operations of the electronic device 1000. The processor 1002 can communicate, either directly or indirectly, with some or all of the components of the electronic device 1000. For example, a system bus or other communication mechanism 1014 can provide communication between the processor 1002, the I/O mechanism 1004, the memory 1008, the sensors 1010, and the power source 1012.

The processor 1002 can be implemented as any electronic device capable of processing, receiving, or transmitting data or instructions. For example, the processor 1002 can be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitable computing element or elements.

It should be noted that the components of the electronic device 1000 can be controlled by multiple processors. For example, select components of the electronic device 1000 (e.g., a sensor 1010) may be controlled by a first processor and other components of the electronic device 1000 and other components of the electronic device 1000 (e.g., the I/O 1004) may be controlled by a second processor, where the first and second processors may or may not be in communication with each other.

The I/O device 1004 can transmit and/or receive data from a user or another electronic device. An I/O device can transmit electronic signals via a communications network, such as a wireless and/or wired network connection. Examples of wireless and wired network connections include, but are not limited to, cellular, Wi-Fi, Bluetooth, IR, and Ethernet connections. In some cases, the I/O device 1004 can communicate with an external electronic device, such as a smartphone, smartwatch, or other portable electronic device, as described here.

The electronic device may optionally include a display 1006 such as a liquid-crystal display (LCD), an organic light emitting diode (OLED) display, a light emitting diode (LED) display, or the like. If the display 1006 is an LCD, the display 1006 may also include a backlight component that can be controlled to provide variable levels of display brightness. If the display 1006 is an OLED or LED type display, the brightness of the display 1006 may be controlled by modifying the electrical signals that are provided to display elements. The display 1006 may correspond to any of the displays shown or described herein.

The memory 1008 can store electronic data that can be used by the electronic device 1000. For example, the memory 1008 can store electrical data or content such as, for example, audio and video files, documents and applications, device settings and user preferences, timing signals, control signals, and data structures or databases. The memory 1008 can be configured as any type of memory. By way of example only, the memory 1008 can be implemented as random access memory, read-only memory, Flash memory, removable memory, other types of storage elements, or combinations of such devices.

The electronic device 1000 may also include one or more sensors 1010 positioned almost anywhere on the electronic device 1000. The sensor(s) 1010 can be configured to sense one or more types of parameters, such as but not limited to, pressure, light, touch, heat, movement, relative motion, biometric data (e.g., biological parameters), and so on. For example, the sensor(s) 1010 may include a heat sensor, a position sensor, a light or optical sensor, an accelerometer, a pressure transducer, a gyroscope, a magnetometer, a health monitoring sensor, and so on. Additionally, the one or more sensors 1010 can utilize any suitable sensing technology, including, but not limited to, capacitive, ultrasonic, resistive, optical, ultrasound, piezoelectric, and thermal sensing technology.

The power source 1012 can be implemented with any device capable of providing energy to the electronic device 1000. For example, the power source 1012 may be one or more batteries or rechargeable batteries. Additionally or alternatively, the power source 1012 can be a power connector or power cord that connects the electronic device 1000 to another power source, such as a wall outlet.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device comprising:
   a cover;
   a haptic module positioned below the cover and comprising:
   a substrate positioned below the cover;
   a spacer positioned between the substrate and the cover and coupling the substrate to the cover, the spacer and the substrate suspended from the cover by one or more adhesive layers, wherein the haptic module is unsupported along a bottom of the substrate;

a piezoelectric element positioned on the substrate and offset from the cover to define a gap between the piezoelectric element and the cover; and a flexible circuit comprising a first portion positioned between the piezoelectric element and the substrate, a second portion positioned between the spacer and the substrate, and a third portion positioned outside an outer edge of the spacer, the first portion of the flexible circuit electrically coupled to the piezoelectric element and the third portion of the flexible circuit comprising an electrical interface;

a sensor coupled to the cover and configured to detect an input; and circuitry electrically coupled to the electrical interface of the flexible circuit and configured to provide an electronic input that is received by the piezoelectric element, in response to the electronic input, the piezoelectric element changes length causing the substrate to bend in a buckling mode and produce a localized deformation of the cover.

2. The electronic device of claim 1, wherein:

the sensor comprises a first electrode separated from a second electrode by a distance;

the input causes a change in the distance between the first electrode and the second electrode; and the sensor is configured to estimate a force of the input in response to the change in the distance between the first electrode and the second electrode.

3. The electronic device of claim 2, wherein the sensor is configured to detect a location of the input in response to the estimated force of the input exceeding a threshold.

4. The electronic device of claim 2, further comprising an enclosure component, wherein:

the cover is coupled to the enclosure component; and a portion of the enclosure component forms the second electrode.

5. The electronic device of claim 2, wherein:

the first and the second electrodes are part of a first force sensor that outputs a first force signal;

the electronic device further comprises a second force sensor that outputs a second force signal; and the circuitry is configured to determine a location of the input based on the first and the second force signals.

6. The electronic device of claim 5, wherein:

the first force sensor is positioned along a first side of the haptic module; and the second force sensor is positioned along a second side of the haptic module.

7. The electronic device of claim 1, further comprising an enclosure component, wherein:

the enclosure component comprises a platform extending under the cover;

the platform defines an opening; and the haptic module is positioned at least partially within the opening.

8. The electronic device of claim 1, wherein:

the cover defines a virtual keyboard comprising one or more key regions; and the electronic device comprises multiple haptic modules positioned below the virtual keyboard and configured to provide haptic outputs along the one or more key regions.

16

9. An electronic device comprising:

an enclosure component;

a cover coupled to the enclosure component;

first and second haptic modules positioned below the cover and each of the first and second haptic modules comprising:

an actuation strip comprising:

a substrate; and a piezoelectric element attached to the substrate; and a spacer positioned between the actuation strip and the cover and defining a gap between the actuation strip and the cover, the spacer, the piezoelectric element and the substrate suspended from the cover by one or more adhesive layers, wherein the actuation strip is unsupported along a bottom of the substrate; and a flexible circuit comprising a first portion positioned between the piezoelectric element and the substrate, a second portion positioned between the spacer and the substrate, and a third portion positioned outside an outer edge of the spacer, the first portion of the flexible circuit electrically coupled to the piezoelectric element and the third portion of the flexible circuit comprising an electrical interface;

a touch sensor positioned along the cover and configured to determine a location of a touch input received at the cover; and circuitry electrically coupled to the electrical interface of the flexible circuit and configured to provide an electronic input that is received by the piezoelectric element, in response to the electronic input, the piezoelectric element changes length causing the substrate of at least one of the first haptic module or the second haptic module to bend in a buckling mode and produce a localized deformation of the cover.

10. The electronic device of claim 9, wherein:

the touch sensor comprises:

an array of first electrodes positioned below the cover; and an array of second electrodes offset from the array of first electrodes;

at least one electrode of the array of first electrodes is configured to deflect in response to the touch input; and the circuitry is configured to determine the location of the touch input based on the deflection of the at least one electrode.

11. The electronic device of claim 10, wherein the circuitry is configured to estimate a force of the touch input based on the deflection of the at least one electrode.

12. The electronic device of claim 9, wherein the circuitry is configured to:

actuate the first haptic module with a first signal based on the determined location of the touch input;

actuate the second haptic module with a second signal, different from the first signal, based on the determined location of the touch input; and the actuation of the first and second haptic modules provides a haptic output at the determined location along the cover.

13. The electronic device of claim 9, wherein:

the first haptic module includes a strip of piezoelectric material having a length extending in a first direction;

actuating the first haptic module causes a change in the length of the piezoelectric element; and in response to the change in the length of the piezoelectric element, the cover deflects in a second direction that is transverse to the first direction.

14. The electronic device of claim 9, wherein:

the cover comprises a glass sheet and a display layer positioned below the glass sheet; and the first and second haptic modules are positioned below the display layer.

15. The electronic device of claim 9, further comprising a flexible seal positioned between the cover and the enclosure component, wherein:

the cover is coupled to the enclosure component by the flexible seal; and the flexible seal comprises a force sensor that is configured to estimate a force of the touch input.

16. An electronic device comprising:

an upper portion comprising a display;

a lower portion coupled to the upper portion and defining:

a keyboard; and a track pad;

a haptic module positioned below the track pad and comprising:

a spacer attached to an internal surface of the track pad; and an actuation strip coupled to the spacer thereby defining a gap between the actuation strip and the internal surface of the track pad, the spacer and the actuation strip suspended from the internal surface of the track pad by one or more adhesive layers, wherein the haptic module is unsupported along a bottom of the haptic module, the actuation strip comprising:

a substrate; and a piezoelectric element coupled to the substrate;

a flexible circuit comprising a first portion positioned between the piezoelectric element and the substrate, a second portion positioned between the spacer and the substrate, and a third portion positioned outside an outer edge of the spacer, the first portion of the flexible circuit electrically coupled to the piezoelectric element and the third portion of the flexible circuit comprising an electrical interface; and circuitry electrically coupled to the electrical interface of the flexible circuit and configured to provide an input that is received by the piezoelectric element, in response to the input, the piezoelectric element changes length causing the substrate to bend in a buckling mode and produce a localized deformation of the track pad.

17. The electronic device of claim 16, further comprising:

a first set of electrodes;

a second set of electrodes separated from the first set of electrodes by a distance; and an array of flexible structures positioned between the first set of electrodes and the second set of electrodes.

18. The electronic device of claim 17, wherein:

the array of flexible structures is configured to deform in response to a touch input received at the track pad and cause a change in the distance between a first electrode of the first set of electrodes and a second electrode of the second set of electrodes; and the circuitry is configured to determine a location of the touch input based on the change in the distance between the first electrode and the second electrode.

19. The electronic device of claim 18, wherein the circuitry is configured to:

estimate a force of the touch input based on the change in the distance between the first electrode and the second electrode; and control an amount of deflection of the haptic module based on the determined location of the touch input, the estimated force of the touch input, or a combination thereof.

20. The electronic device of claim 16, wherein:

the haptic module is a first haptic module;

the electronic device further comprises a second haptic module; and the circuitry is configured to:

actuate the first haptic module to cause a first amount of deflection based on a location of a touch input; and actuate the second haptic module to cause a second amount of deflection, different from the first amount of deflection, based on the location of the touch input.

* * * * *